United States Patent
Low et al.

(10) Patent No.: US 9,507,578 B2
(45) Date of Patent: Nov. 29, 2016

(54) APPLICATION INSTANCE STAGING

(71) Applicant: International Business Machines Corporation, Armonk, NY (US)

(72) Inventors: Andrew R. Low, Stittsville (CA); Lei Wang, Shanghai (CN); Hai Hong Xu, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/753,111

(22) Filed: Jun. 29, 2015

(65) Prior Publication Data

US 2015/0378690 A1    Dec. 31, 2015

Related U.S. Application Data

(63) Continuation-in-part of application No. 14/743,367, filed on Jun. 18, 2015.

(30) Foreign Application Priority Data

Jun. 27, 2014   (CN) .......................... 2014 1 0302501

(51) Int. Cl.
G06F 9/455   (2006.01)
G06F 9/445   (2006.01)

(52) U.S. Cl.
CPC ............. *G06F 8/61* (2013.01); *G06F 9/45504* (2013.01)

(58) Field of Classification Search
None
See application file for complete search history.

(56) References Cited

U.S. PATENT DOCUMENTS

| | | | |
|---|---|---|---|
| 8,635,351 B2* | 1/2014 | Astete | 709/215 |
| 2006/0184926 A1* | 8/2006 | Or | G06F 8/61 717/168 |
| 2011/0047594 A1* | 2/2011 | Mahaffey | G06F 21/564 726/1 |
| 2012/0084393 A1* | 4/2012 | Williams | G06F 8/61 709/217 |
| 2012/0084769 A1* | 4/2012 | Adi | G06F 8/63 717/174 |
| 2014/0298318 A1 | 10/2014 | Ahn et al. | |

OTHER PUBLICATIONS

Low, et al., "An Application Instance Staging Method and System", China Application No. 201410302501.5, filed Jun. 27, 2014. 23 pages.
Low, et al., "Application Instance Staging", U.S. Appl. No. 14/743,367, filed Jun. 18, 2015.
Mell, et al., "The NIST Definition of Cloud Computing", Recommendations of the National Institute of Standards and Technology. NIST Special Publication 800-145. Sep. 2011. 7 pages.
Unknown, "Heroku Buildpack for Node.js", https://github.com/ibmdb/db2nodejsbuildpack Last printed Apr. 9, 2015, 11:30 AM, CST. 3 pages.
List of IBM Patents or Patent Applications Treated as Related.

\* cited by examiner

*Primary Examiner* — Tuan Dao
(74) *Attorney, Agent, or Firm* — Brian Welle

(57) ABSTRACT

An application instance staging method comprises installing a runtime environment for an application program pushed to a cloud client; installing dependency of the application program; reading an environment variable of the application program to identify a functional service bound to the application program; modifying the application program based on the functional service bound to the application program; and packaging the modified application program, runtime environment, and dependency into an executable droplet.

18 Claims, 9 Drawing Sheets

APPLICATION INSTANCE STAGING

BACKGROUND

The present disclosure relates to cloud computing, and more specifically, to a method and a system for performing application instance staging in a cloud computing platform.

PaaS (Platform-as-a-Service) is a business mode offering a platform as a service. Providers of PaaS can provide platform level products such as operating systems, application servers, and application development environments to a user through a web service. Via PaaS service, a software developer can develop and deploy a new application program without purchasing platform software.

Take a web application program, for example. Generally, a web application program needs to be deployed on an application server which runs on an operating system, and the operating system runs on a hardware environment. Both the application server and the operating system are platform level products. Under a cloud computing environment, hardware can be provided as a service through IaaS (Infrastructure-as-a-Service). A required hardware environment can be provided by a virtualized infrastructure such as virtual machine, whereas a cloud computing platform integrates functions of the application server and the operating system. A user can directly develop and deploy his own application program on that platform without having to build his own platform.

In order to deploy a user's application program on a cloud computing platform, the user first pushes the application program to the cloud computing platform. The cloud computing platform then analyzes the type of application program, prepares a corresponding runtime environment of the application program according to the type of application program, installs dependency of the application program, packages them into a runnable droplet and stores it in the cloud system. This process is referred to as "application instance staging". A main module for performing application instance staging in a cloud computing platform is referred to as buildpack. Generally, a buildpack is specific to a type of application program. Within a same cloud computing platform, there is often a plurality of buildpacks for processing different types of application programs. For example, there is a java buildpack for a Java application deployed on the cloud computing platform; and there is a node.js buildpack for a node.js application. After application programs have been pushed to the cloud computing platform, the cloud computing platform invokes, one by one, buildpacks for processing different types of application programs. If a buildpack discovers that the type of application program is one which is to be processed by that buildpack, then that buildpack starts to perform application instance staging on that application program.

With ever increasing diversity and complexity of application programs, existing buildpacks may not be able to realize functions of performing application instance staging under some scenarios. Therefore, there is a need to make a certain degree of improvement on existing buildpacks.

SUMMARY

According to one embodiment, there is provided an application instance staging method. The method comprises installing a runtime environment for an application program pushed to a cloud client; installing a dependency of the application program; reading an environment variable of the application program to identify a functional service bound to the application program; modifying the application program based on the functional service bound to the application program; and packaging the modified application program, runtime environment, and dependency into an executable droplet.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
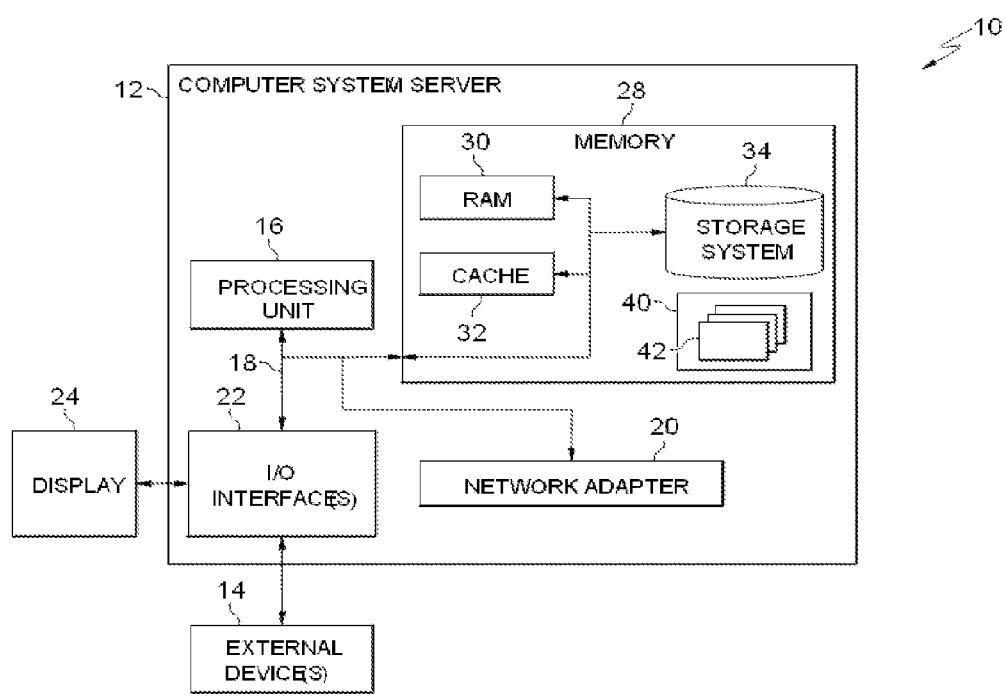
FIG. 1 depicts one embodiment of an illustrative cloud computing node.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, various embodiments are capable of being implemented in conjunction with any other type of computing environment known to one of skill in the art.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
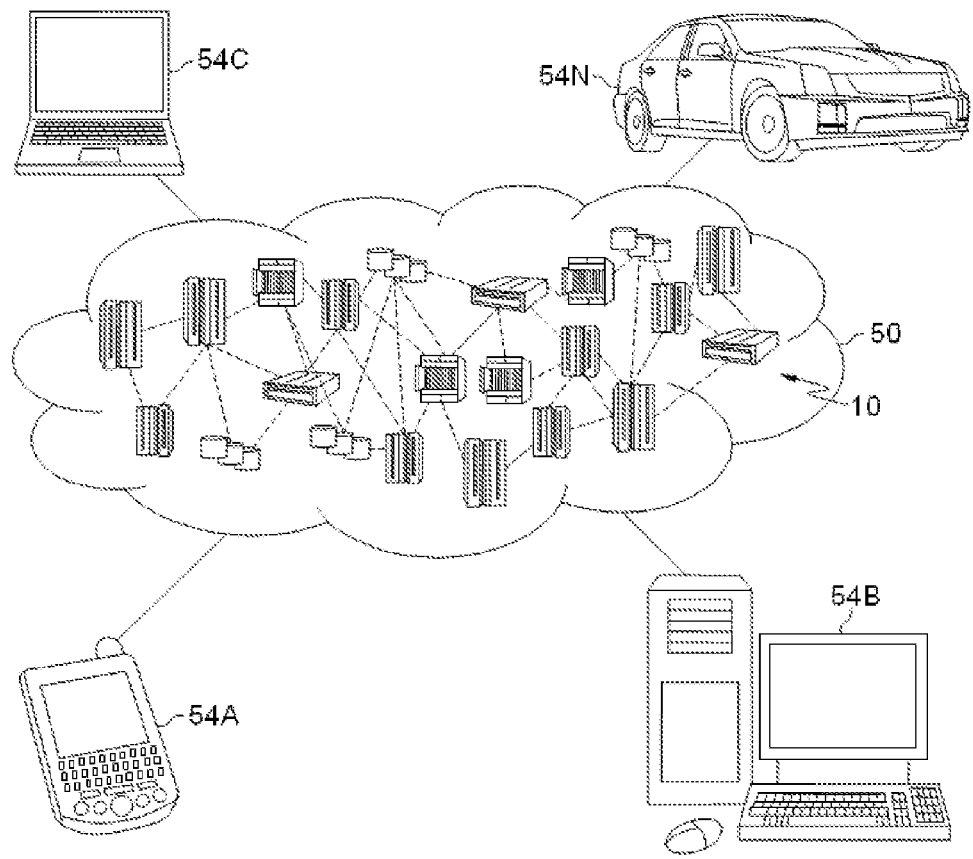
FIG. 2 depicts one embodiment of an illustrative cloud computing environment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
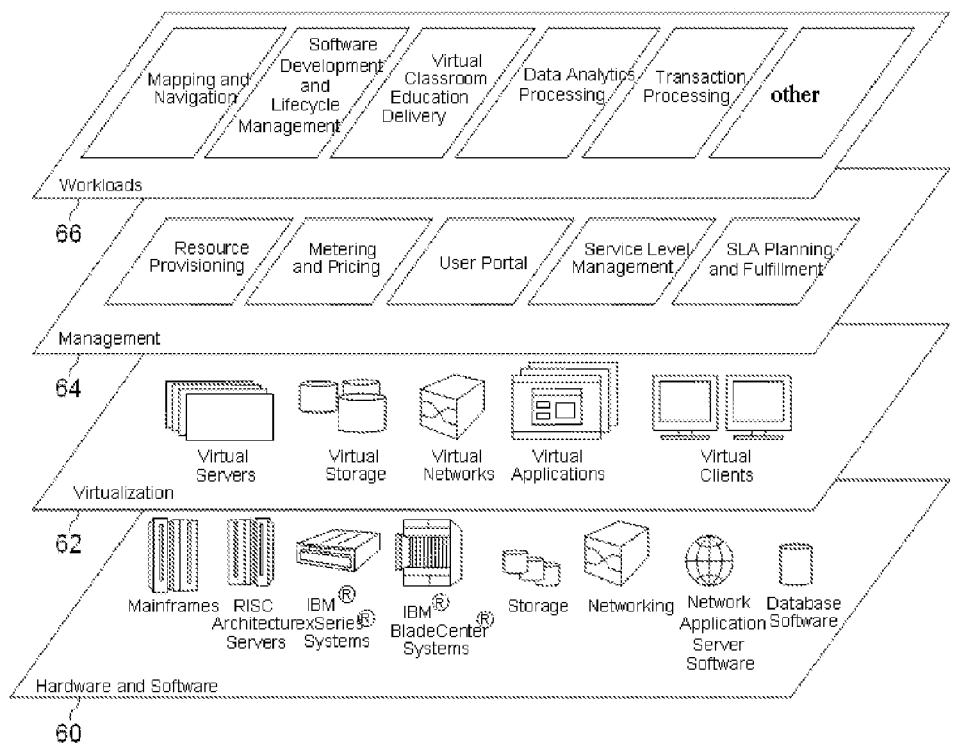
FIG. 3 depicts one embodiment of illustrative abstraction model layers.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing.

Figure 4:
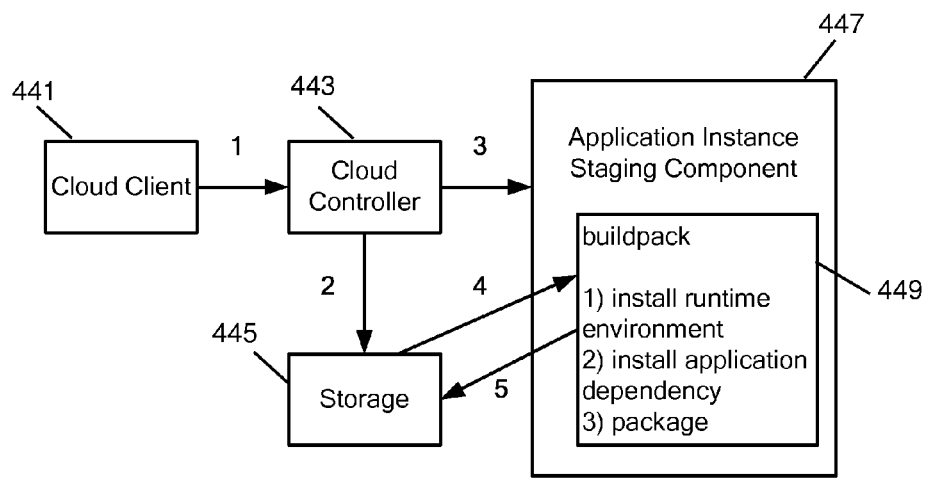
FIG. 4 depicts one embodiment of an illustrative process flow of performing application instance staging.

FIG. 4 depicts one embodiment of an illustrative process flow of performing application instance staging in the cloud for a user pushing an application to a PaaS type of cloud computing platform. In FIG. 4, a user pushes an application from a cloud client 441 to a cloud computing platform, as indicated by arrow 1. The controller 443 of the cloud computing platform stores the user's application in a storage 445 after receiving the application, as indicated by arrow 2. Additionally, the controller 443 of the cloud computing platform issues an instruction to a working component 447 for performing application instance staging, as indicated by arrow 3. The working component 447 then installs a runtime environment for the user's application using a buildpack 449, installs dependency of the application program, and then packages them, as indicated by arrow 4. The working component 447 then stores the packaged executable package in the storage 445 for future running, as indicated by arrow 5.

Sometimes, an application program needs to invoke some functional services provided by the platform, such as database functional service, monitoring functional service, etc. The database functional service provides the capability of accessing a database to the application program. The monitoring functional service may monitor status, resource consumption of the application program or the like, and report them to the application program. Due to diversity and complexity of functional services, an application program may not always be able to interact with the functional services directly. Taking database functional service for example, if a user application program needs to use a database, the user needs to bind a database functional service to the application program, so that the application program may connect to this database functional service to perform operations such as add, delete, update, select, and so on. One premise is that the user's application program needs to have therein a driver for connecting to this database functional service. Therefore, the application program needs to be extended. For example, it may be required that a driver such as an agent or a library file is pre-installed to the application program and, even then, there is a need to modify code of the application program and set environment variables, etc., for the application program to interact with the functional service.

However, at the fourth step (arrow 4) shown in FIG. 4, i.e. in the process of performing the application instance staging by the buildpack, nothing is done for services bound to the application program. Accordingly, a provider of an application program needs to consider interaction problems between the application program and the functional services. For example, in development stage of an application program, the provider of the application program needs to determine which functional services will be invoked, and make necessary modification to the application program for each determined functional service, such as pre-installing an agent or a library file, etc. This solution will bring additional burden to the provider of an application program Implementation of a functional service is usually diverse and complex and, thus, it is quite difficult for the provider of an application program to learn the manner of use of each functional service and its prerequisite conditions. Such additional burden weakens advantages brought by PaaS, since in the case of PaaS, the provider of an application program should have focused on business logic of the application program itself. Furthermore, such a solution is inflexible, since an application program can only interact with specific functional service(s) selected in development stage. Once the functional service is updated, there may be a need to modify the application program again, so that the application program will be able to interact with the updated functional service.

Therefore, there is a need to simplify work that needs to be finished manually by a provider of an application program before pushing the application program to a cloud computing platform, so that in the process of performing application instance staging of the cloud computing platform, corresponding extension and modification to the application program can be made automatically according to services bound to user's application program.

Figure 5:
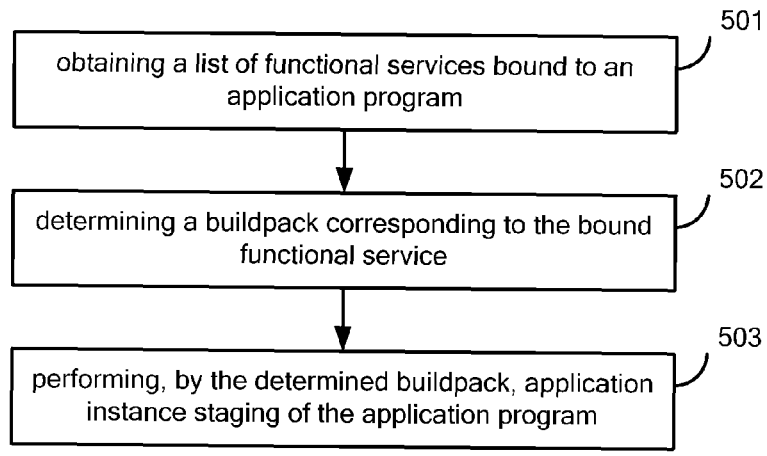
FIG. 5 depicts a flowchart of one embodiment of an illustrative method for performing application instance staging.

To solve the problem discussed above, a method for performing application instance staging is developed at a management layer (i.e. layer 64 in FIG. 3) of a cloud computing platform. One embodiment of the method for performing application instance staging is described below with reference to FIG. 5.

At block 501, a list of functional services bound to an application program is obtained. Functional services to be bound may be specified in the application program. Thus, the information may be extracted by a cloud computing platform from the application program after the application program has been pushed to the cloud computing platform. Those skilled in the art will appreciate that the type of application program, required runtime environment, required dependency and the like need to be notified to the cloud computing platform when pushing the application program to the cloud computing platform. Similar means may be employed to enable the cloud computing platform to obtain information about the bound functional services from the application program.

At block 502, a buildpack corresponding to the bound functional service is determined. According to one embodiment, the buildpack corresponding to the bound functional service is developed and deployed on the cloud computing platform by a provider of that functional service. As described above, it is expected that the buildpack is able to automatically realize interface between the application program and the functional service in the process of application instance staging. The provider of the functional service knows what kind of extension needs to be performed on the application program, such as, but not limited to, how to pre-install an agent or a library file to the application program, how to modify code of the application program, how to set environment variables of the application program, etc. in order to enable the application program to interact with the functional service. Therefore, the provider of the functional service may develop a buildpack by himself.

As described above, application programs may be of different types, such as a java application program or a node.js application program. The provider of the functional service also needs to develop different buildpacks for different types of application programs when developing a buildpack corresponding to that functional service. Those skilled in the art will appreciate that, in order to develop a buildpack, the provider of the functional service also needs to have knowledge about the specific cloud computing platform. In particular, the provider of the functional service needs to have a very deep understanding about the process of application instance staging on that specific cloud computing platform, so that the buildpack is able to be deployed to the specific cloud computing platform.

To reduce workload of the provider of the functional service and shorten the time to deploy the functional service to the cloud computing platform, a framework may be provided to facilitate the provider of the functional service making extensions to a generic buildpack, rather than redeveloping a buildpack dedicated to that functional service.

According to another embodiment, a generic buildpack is converted into a buildpack corresponding to the functional service by installing a plugin corresponding to that functional service. Thus, determining a buildpack corresponding to the bound functional service described above, in such an embodiment, includes determining a plugin corresponding to the functional service and loading the plugin into the generic buildpack. Those skilled in the art will appreciate that, the so-called generic buildpack herein may be directed to application programs of a same or similar type. That is, the generic buildpack may be used to handle all application programs of the same type. This embodiment is further described below in conjunction with other drawings.

At block 503, the determined buildpack performs application instance staging of the application program. At block 502, the buildpack corresponding to the functional service is determined. The buildpack has learned what kind of extension needs to be performed on the application program to enable the application program to interact with the functional service. Therefore, by performing application instance staging by that buildpack, the application program may be automatically extended. The buildpack also performs other acts required in application instance staging, such as installing a runtime environment, installing application dependency, packaging, etc.

Figure 6A:
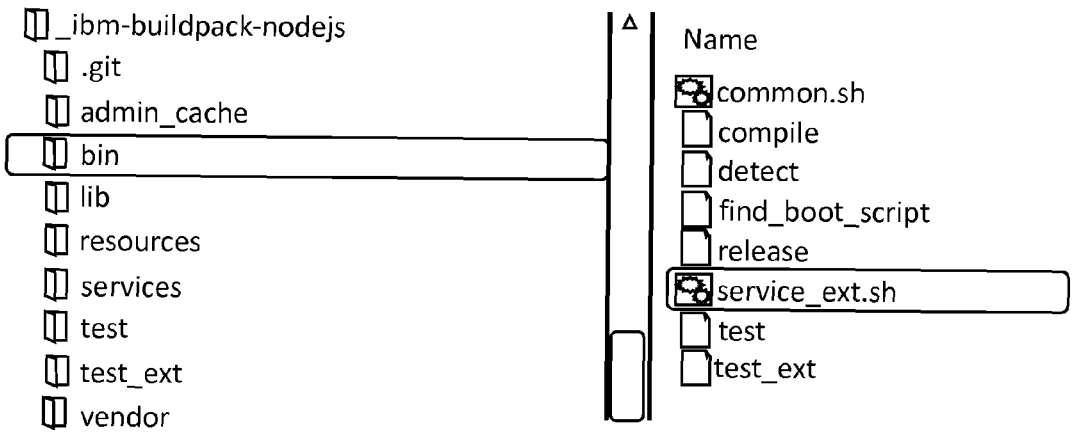
FIG. 6A, FIG. 6B, FIG. 7A and FIG. 7B depict illustrative embodiments of illustrations of performing application instance staging.
Figure 6B:
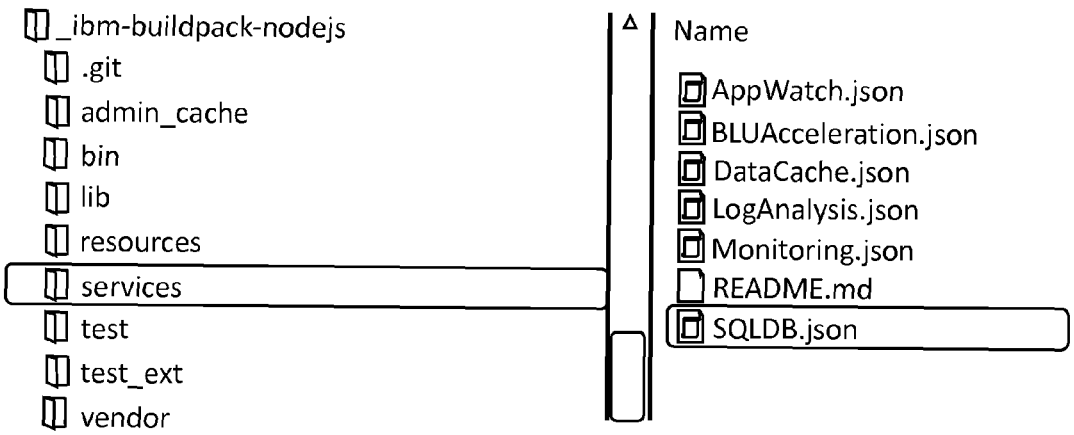

One embodiment of a process of determining a buildpack corresponding to a bound functional service according is described below in conjunction with FIG. 6A and FIG. 6B.

According to one embodiment, a plugin corresponding to the functional service is provided by the provider of the functional service. The provider of the functional service uploads the plugin to the cloud computing platform, and registers that plugin to a buildpack of the cloud computing platform, as described in more detail below with respect to FIG. 9 and FIG. 10.

A generic buildpack can record a corresponding relationship between a registered functional service and a plugin under a first directory, and store the plugin under a second directory. For example, for a directory structure shown in FIG. 6A, a corresponding relationship between a registered functional service and a plugin may be recorded in file service_ext.sh under the directory bin, and a plugin corresponding to each functional service is stored under the directory services, as shown in FIG. 6B. In FIGS. 6A and 6B, a file ending with .json represents a plugin corresponding to each functional service. Code of the example file service_ext.sh referenced in FIG. 6A may correspond to following pseudo-code in some embodiments:

```
*************************************************
If an application program is bound to a functional service "application watch", a file AppWatch.json is installed
If an application program is bound to a functional service "acceleration",
a file BLUAcceleration.json is installed
If an application program is bound to a functional service "data cache",
a file DataCache.json is installed
If an application program is bound to a functional service "log analysis",
a file LogAnalysis.json is installed
If an application program is bound to a functional service "monitoring",
a file Monitoring.json is installed
If an application program is bound to a functional service "database",
a file SQLDB.json is installed
*************************************************
```

Figure 7A:
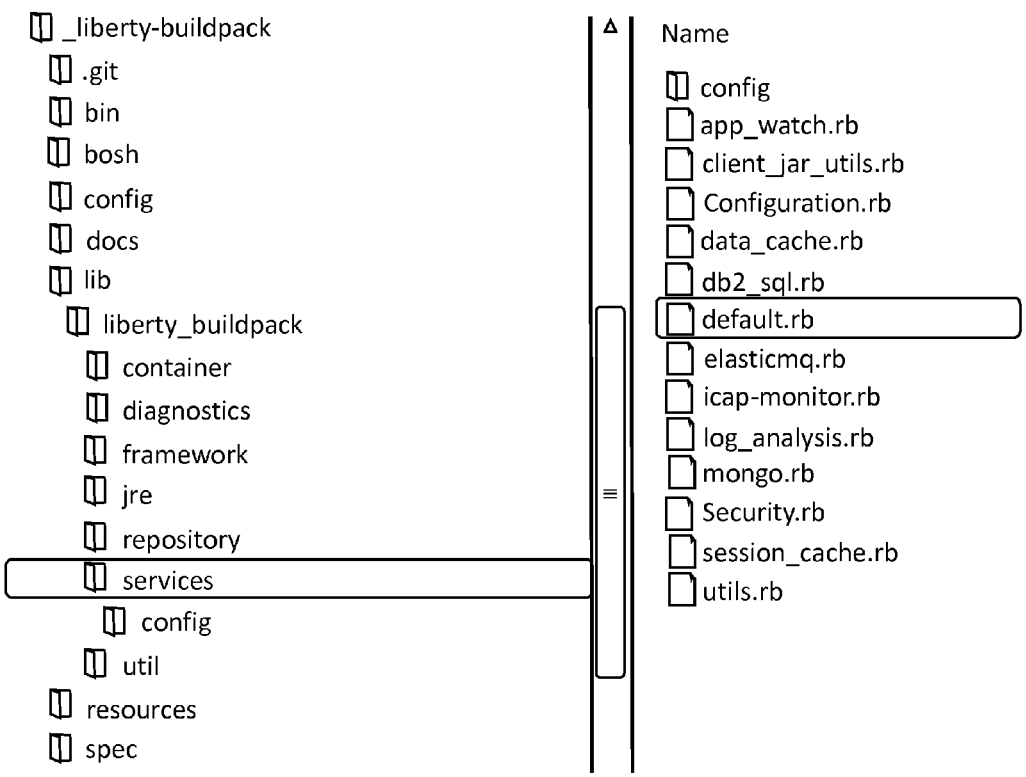
Figure 7B:
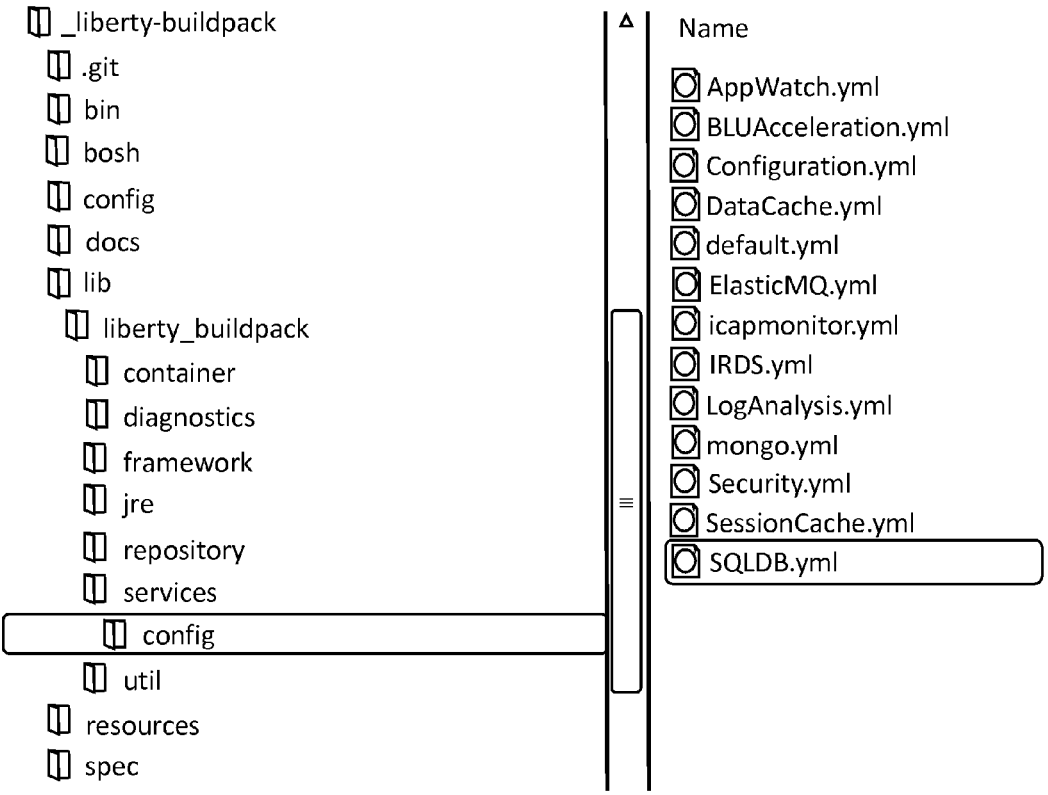

Similarly, in the directory structures shown in FIG. 7A and FIG. 7B, a file default.rb under the directory services is used to record a corresponding relationship between a registered functional service and a plugin, and each .yml file under the directory config in FIG. 7B is a plugin corresponding to each functional service.

According to one embodiment, the plugin may be directly invoked by the buildpack, thereby extending the application program directly by the plugin. According to another embodiment, the plugin may also be converted into instructions understandable by the buildpack after being parsed by the buildpack, and then the instructions are executed by the buildpack. By installing or parsing a plugin corresponding to a functional service, a generic buildpack becomes a buildpack corresponding to that functional service. That buildpack automatically extends the application program according to requirements of the functional service in the process of application instance staging. For example, the buildpack may insert a driver into the application program, modify code of the application program, set environment variables of the application program, etc., as described in more detail with respect to FIG. 9 and FIG. 10.

Various embodiments for implementing the method have been described above with reference to the drawings. Those skilled in the art will appreciate that, the above method may be implemented either in software or in hardware or in a combination thereof. Furthermore, those skilled in the art will appreciate that, by implementing various steps of the above method in software, hardware or a combination thereof, a system in which program modules are deployed based on a same inventive concept may be provided. Although hardware structure of that system is the same as that of a generic processing device, that system shows features distinguished from the generic processing device due to functions of the software included therein, thereby forming an apparatus of embodiments of the present invention. The apparatus of the present invention comprises several units or modules, which are configured to perform corresponding steps. Those skilled in the art may understand how to write a program to realize actions performed by the units or the modules through reading the specification. Since the system is based on the same inventive concept as the method, same or corresponding implementation details therein are also applicable to the apparatus corresponding to the above method, which may not be described hereinafter for brevity, since they have been specifically and completely described hereinabove.

Figure 8:
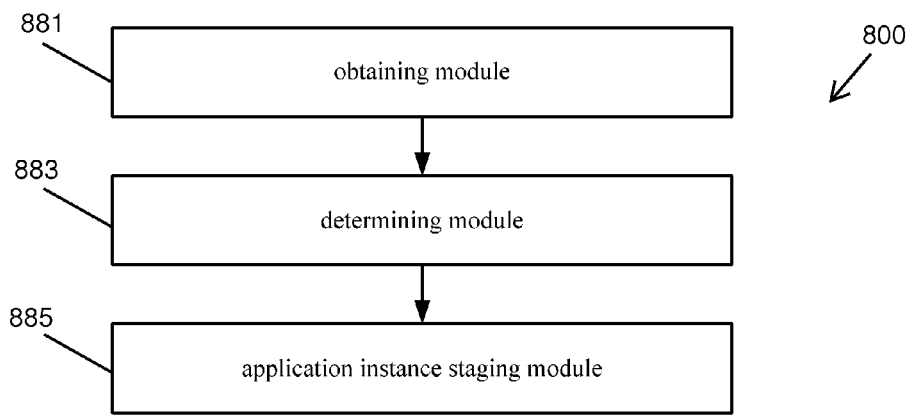
FIG. 8 depicts a block diagram of one embodiment of an illustrative apparatus for performing application instance staging.

FIG. 8 depicts one embodiment of an illustrative block diagram of an application instance staging apparatus 800. The application instance staging apparatus includes an obtaining module 881 configured to obtain a list of functional services bound to an application program, a determining module 883 configured to determine a buildpack corresponding to the bound functional service; and an application instance staging module 885 configured to make the determined buildpack perform application instance staging of the application program.

The determining module 883 includes a module configured to install a plugin corresponding to the functional service to a generic buildpack of a cloud computing platform, such that the generic buildpack is converted into a buildpack corresponding to that functional service. The plugin is uploaded to the cloud computing platform and is registered to the generic buildpack of the cloud computing platform by a provider of the functional service. In some embodiments, the plugin can comprise a plugin capable of being invoked by the generic buildpack or a plugin capable of being parsed by the generic buildpack.

The application instance staging module 885 includes at least one of a module configured to modify code of the application program according to requirement of the functional service; a module configured to pre-install a driver to the application program according to requirement of the functional service; and/or a module configured to set environment variables of the application program according to requirement of the functional service.

It is to be understood that each of the obtaining module 881, determining module 883, and the application instance staging module 885 can be implemented via a processing unit which includes or functions with software programs, firmware or other computer readable instructions for carrying out various methods, process tasks, calculations, and control functions, used in performing the respective functions of the modules discussed above. For example, the obtaining module 881, determining module 883, and the application instance staging module 885 can be implemented by the processing unit 16 executing respective modules 42 stored in memory 28 of FIG. 1.

Figure 9:
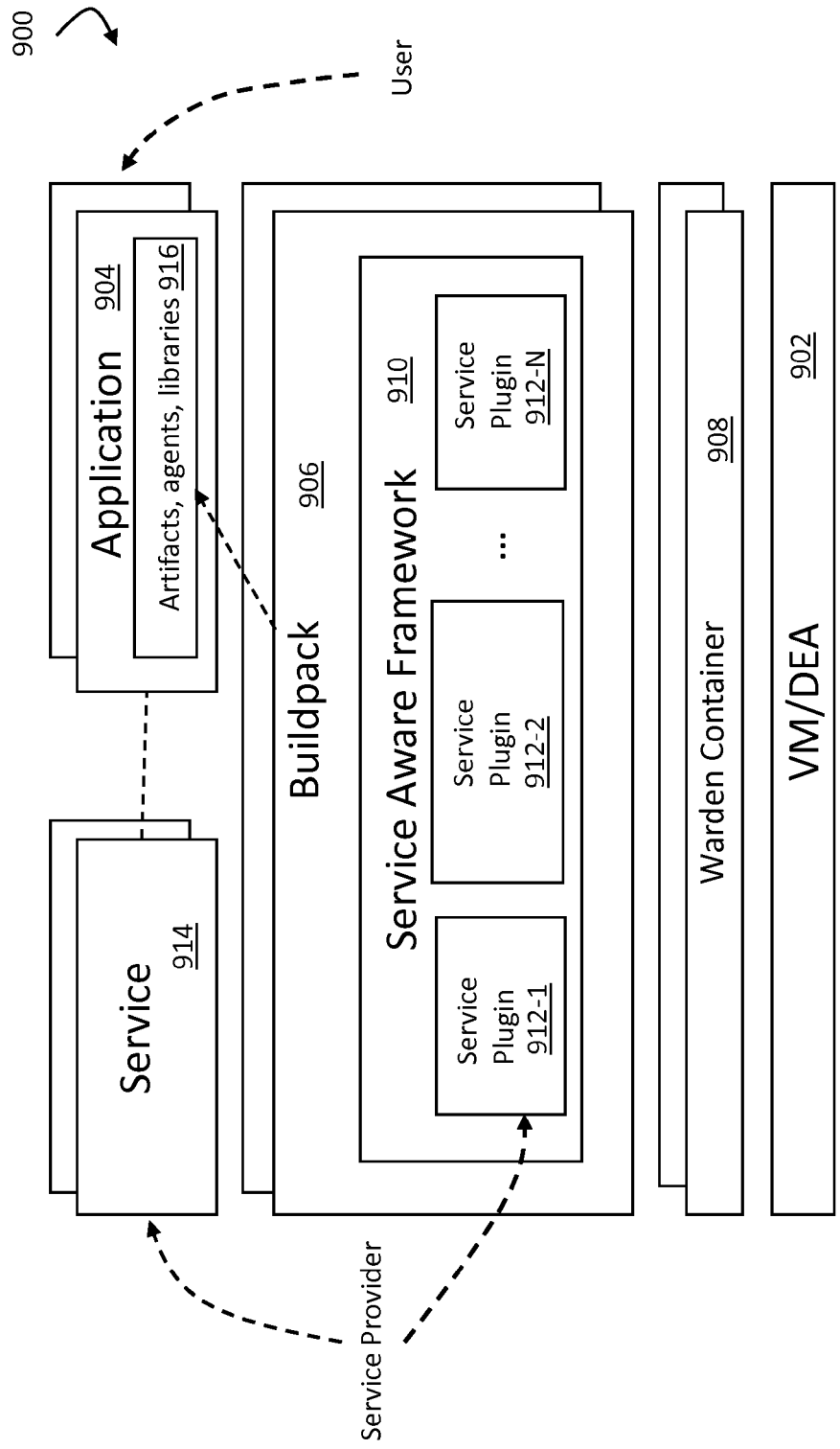
FIG. 9 is a high level block diagram depicting the architecture of one embodiment of an illustrative system.

FIG. 9 is a high level block diagram depicting the architecture of one embodiment of an illustrative system 900. The system 900 includes one or more virtual machines (VM)/Droplet Execution Agents (DEA) 902. As understood by one of skill in the art, a DEA 902 is configured to stage one or more applications 904 pushed to the cloud computing platform by a user. In particular, as discussed herein and understood by one of skill in the art, a cloud controller, such as cloud controller 443 discussed above, selects a DEA 902 from the pool of available DEAs to stage the application 904. As discussed above, the selected DEA 902 uses the appropriate buildpack 906 to stage the application 904. As discussed above, the result of staging the application 904 is a droplet. In addition, as understood by one of skill in the art, each DEA 902 is also configured to run application droplets in respective warden containers 908. Each DEA 902 is responsible for starting and stopping application droplets based on requests from the cloud controller.

Each buildpack 906 in the system 900 includes a service aware framework 910. Each service aware framework 910 includes one or more service plugins 912-1 ... 912-N (also referred to herein collectively as service plugins 912) provided by a service provider, where N is the total number of service plugins in a given service aware framework 910. Some example service plugins include, but are not limited to, monitoring service plugins, performance analytics plugins, and database access plugins (e.g. Structured Query Language (SQL) database search plugins). Each application 904 is bound to one or more services 914 provided by a service provider. Additionally, each of the one or more service plugins 912 provided by the service provider correspond to a respective one of the services 914. Based on the binding of an application 904 to a service 914, the buildpack 906 utilizes the corresponding service plugin 912 to install the artifacts, agents, libraries 916 for accessing the corresponding service 914 into the application 904, as described in more detail with respect to FIG. 10.

Figure 10:
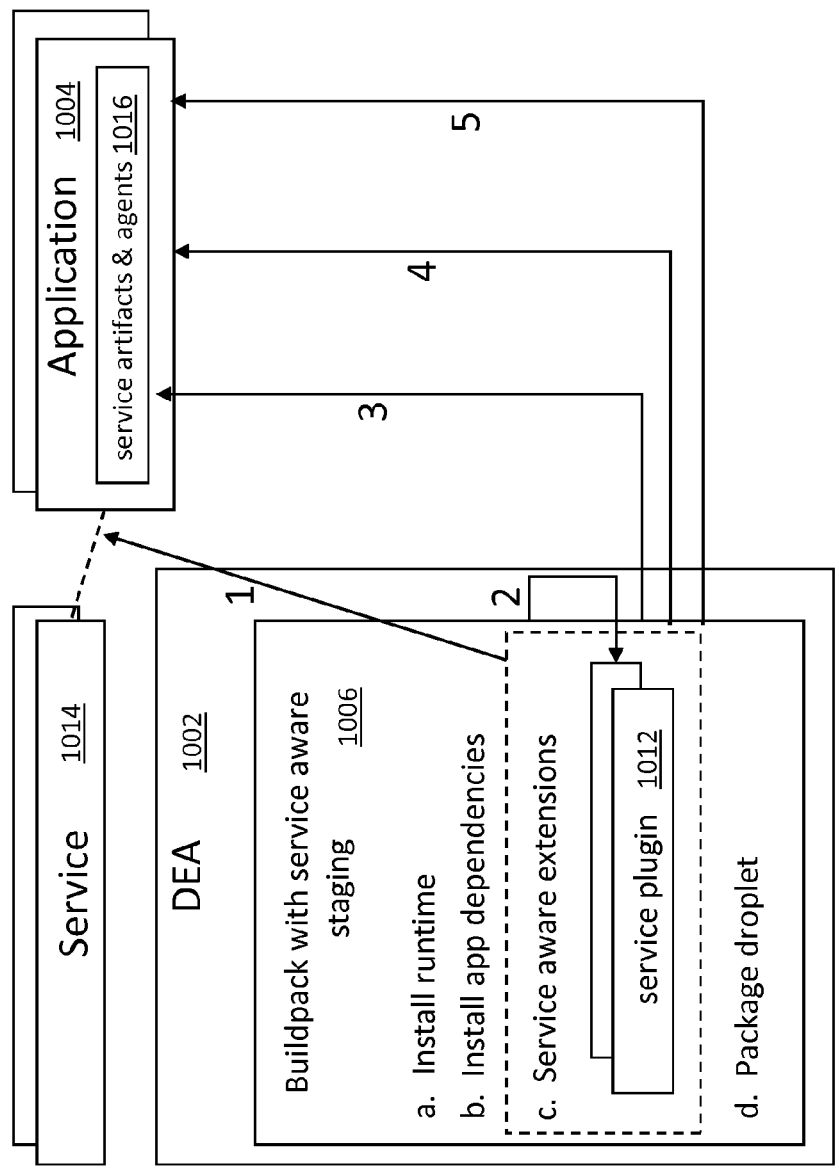
FIG. 10 depicts one embodiment of an illustrative process flow of performing service aware application instance staging.

FIG. 10 depicts one embodiment of an illustrative process flow of performing service aware application instance staging. The process depicted in FIG. 10 is modified from the process described in FIG. 4 in order to provide service aware extensions according to embodiments discussed above. As discussed above, the buildpack 1006, which is executed by the DEA 1002, installs the runtime environment and dependencies of the application program, as well as packages the droplets. In addition, in the example of FIG. 10, the buildpack 1006 also processes service aware extensions. In particular, at least one application 1004 pushed to a cloud client by a user is bound to one or more services 1014. The binding of the application 1004 to the one or more services 1014 is set by the user and the one or more services are deployed by the service provider. The buildpack 1006 identifies which services 1014 are bound to the application 1004 by reading service binding information from the environment variables of the application, as indicated by arrow 1.

After reading the service binding information, the buildpack 1006 verifies the trigger conditions for the service plugins 1012 corresponding to the bound services provided by the service provider, as indicated by arrow 2. In other words, the buildpack 1006 verifies that the conditions have been met to install the appropriate artifacts and libraries for accessing the services, for example. If the conditions have been met, the buildpack 1006 installs service support artifacts 1016 in the application 1004, as indicated by arrow 3. In addition, the buildpack 1006 modifies source code of the application 1004, as necessary to access the bound service (s), as indicated arrow 4. The buildpack 1006 also sets an application running environment variable in the application 1004, as indicated by arrow 5. Thus, the process flow of FIG. 10 de-couples the staging procedure described in FIG. 4 and the service plugin which enables service providers to extend service plugins. In other words, the process flow of FIG. 10 simplifies the work that needs to be finished manually by a provider of an application program before pushing the application program to a cloud computing platform. Additionally, the process flow of FIG. 10 enables the process of performing application instance staging of the cloud computing platform, corresponding extension and modification to the application program to be done automatically according to services bound to user's application program.

Figure 11:
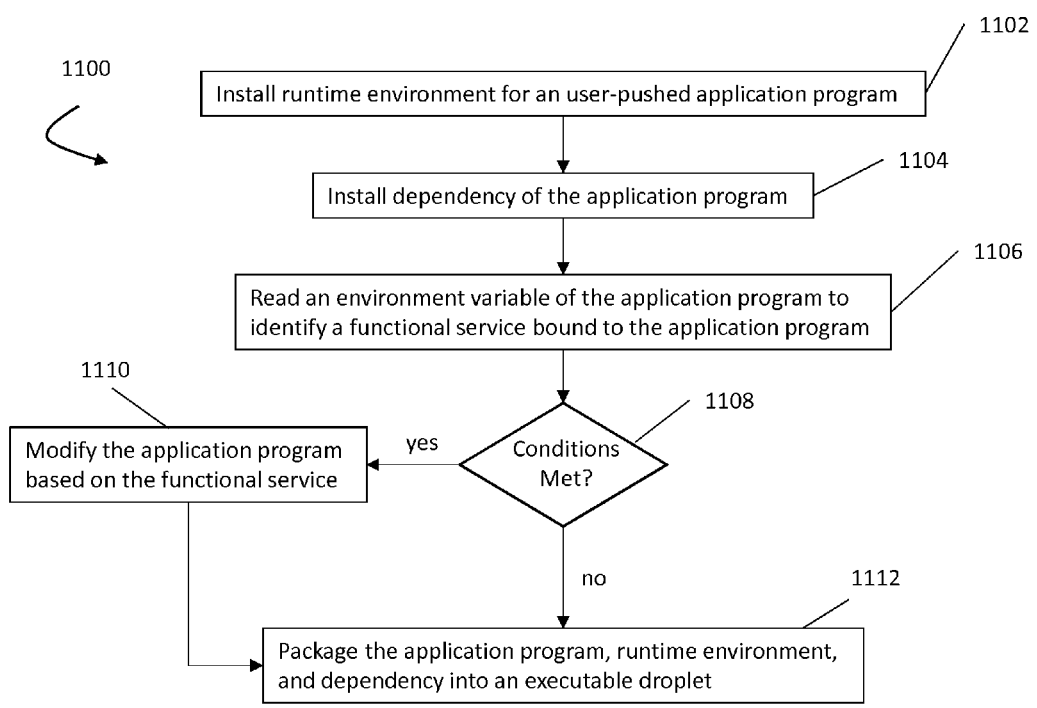
FIG. 11 is a flow chart depicting an example of one embodiment of a method of application instance staging.

FIG. 11 is a flow chart depicting an example of one embodiment of a method 1100 of application instance staging. The method 1100 can be performed by a processor in a processing unit such as processing unit 116 discussed above. At block 1102, a runtime environment for an application program pushed to a cloud client (also referred to herein as a user-pushed application) is installed, as discussed above. At block 1104, dependency of the application program is installed, as discussed above. At block 1106, an environment variable of the application program is read to identify a functional service bound to the application program by the user, as discussed above. At block 1108, the processor verifies if one or more conditions, which correspond to the functional service, for modifying the application program have been met. It is to be understood that the verification at block 1108 is optional and not required in all embodiments.

In response to determining that the trigger conditions have been met at block 1108, the application program is modified based on the functional service bound to the application program, at block 1110. Modifying the application program can include modifying code of the application program according to requirements of the functional service, installing a service support artifact to the application program according to requirements of the functional service, and/or setting an environment variable of the application program according to requirements of the functional service. Installing a service support artifact can include pre-installing a driver to the application program according to requirements of the functional service bound to the application program. At block 1112, the modified application program, runtime environment and dependency are packaged into an executable droplet. If the conditions were not met at block 1108, then the application program, runtime environment and dependency are packaged into the executable droplet at block 1112.

It is to be understood that the method 1100 is presented by way of example only and not by way of limitation. For example, it is to be understood that the method 1100 is not to be construed as limiting the order in which the individual acts may be performed. Furthermore, it is to be understood that some steps can be omitted or other steps can be included. For example, in other embodiments, the method 1100 can include converting a generic buildpack of a cloud computing platform into a buildpack corresponding to the functional service by installing a plugin corresponding to the functional service in the generic buildpack of the cloud computing platform; receiving the plugin uploaded to the cloud computing environment; registering the uploaded plugin to the generic buildpack of the cloud computing environment; invoking the plugin by the generic buildpack; and/or parsing the plugin by the generic buildpack.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of application instance staging, the method comprising:
receiving, by a cloud computing platform, a list of functional services to be bound to an application program pushed to the cloud computing platform prior to the application program being configured to use functional services of the list of functional services;
installing, without user input, a runtime environment for the application program;
binding functional services to the application program using the list of functional services, wherein binding functional services creates a set of environment variables of the application program;
reading an environment variable of the set of environment variables of the application program to identify a functional service bound to the application program, wherein the functional service is included in the list of functional services;
modifying, without user input, the application program based on the functional service bound to the application program; and
packaging, without user input, the modified application program, runtime environment, and dependency into an executable droplet.

2. The method of claim 1, wherein modifying the application program includes at least one of:
modifying code of the application program according to requirements of the functional service;
installing a service support artifact to the application program according to requirements of the functional service; and
setting an environment variable of the application program according to requirements of the functional service.

3. The method of claim 1, further comprising:
converting a generic buildpack of the cloud computing platform into a buildpack corresponding to the functional service by installing a plugin corresponding to the functional service in the generic buildpack of the cloud computing platform.

4. The method of claim 3, further comprising:
receiving the plugin uploaded to the cloud computing platform; and
registering the uploaded plugin to the generic buildpack of the cloud computing platform.

5. The method of claim 3, further comprising one of:
invoking the plugin by the generic buildpack; and
parsing the plugin by the generic buildpack.

6. The method of claim 1, further comprising:
verifying that one or more conditions for modifying the application program corresponding to the functional service have been met prior to modifying the application program.

7. An application instance staging apparatus, comprising:
an interface configured to receive an application program and a list of functional services to be bound to the application program prior to the application program being configured to use functional services of the list of functional services over a network;
a memory; and
a processing unit coupled to the interface and to the memory;
wherein the processing unit is configured to install a runtime environment for the user application program without user input, bind functional services to the application program using the list of functional services such that a set of environment variables are created, read an environment variable of the set of environment variables of the application program to identify a functional service bound to the application program, and modify the application program based on the functional service bound to the application program;
wherein the processing unit is further configured to package the modified application program, runtime environment and dependency into an executable droplet without user input, and to store the executable droplet in the memory.

8. The apparatus of claim 7, wherein the processing unit is configured to modify the application program based on the functional service by:
modifying code of the application program according to requirements of the functional service;
installing a service support artifact to the application program according to requirements of the functional service; or
setting an environment variable of the application program according to requirements of the functional service.

9. The apparatus of claim 7, wherein the processing unit is further configured to install a plugin corresponding to the functional service to a generic buildpack of the cloud computing platform to convert the generic buildpack into a buildpack corresponding to the functional service.

10. The apparatus of claim 9, wherein interface is configured to receive the plugin over the network and the processing unit is configured to register the plugin to the generic buildpack.

11. The apparatus of claim 9, wherein the plugin comprises any one of:
   a plugin capable of being invoked by the generic buildpack; and
   a plugin capable of being parsed by the generic buildpack.

12. The apparatus of claim 7, wherein the processing unit is further configured to verify that one or more conditions for modifying the application program have been met prior to modifying the application program, the one or more conditions corresponding to the functional service.

13. A program product comprising a processor-readable storage medium having program instructions embodied thereon, wherein the computer readable storage medium is not a transitory signal per se, the program instructions executable by a processor to cause the processor to:
   receive, by a cloud computing platform, a list of functional services to be bound to an application program pushed to the cloud computing platform prior to the application program being configured to use functional services of the list of functional services;
   install a runtime environment for the application program without user input; a cloud client by a user;
   bind functional services to the application program using the list of functional services, wherein binding functional services creates a set of environment variables of the application program;
   read an environment variable of the set of environment variables of the application program to identify a functional service bound to the application program by the user wherein the functional service is included in the list of functional services;
   modify the application program based on the functional service bound to the application program without user input; and
   package the modified application program, runtime environment, and dependency into an executable droplet without user input.

14. The program product of claim 13, wherein the program instructions further cause the processor to modify the application program by performing at least one of:
   modifying code of the application program according to requirements of the functional service;
   installing a service support artifact to the application program according to requirements of the functional service; and
   setting an environment variable of the application program according to requirements of the functional service.

15. The program product of claim 13, wherein the program instructions further cause the processor to convert a generic buildpack of the cloud computing platform into a buildpack corresponding to the functional service by installing a plugin corresponding to the functional service in the generic buildpack of the cloud computing platform, the plugin provided by a service provider.

16. The program product of claim 15, wherein the program instructions further cause the processor to receive the plugin over a network connection and to register the plugin to the generic buildpack.

17. The program product of claim 15, wherein the program instructions further cause the processor to invoke the plugin or parse the plugin.

18. The program product of claim 13, wherein the program instructions further cause the processor to verify that one or more conditions corresponding to the functional service for modifying the application program have been met prior to modifying the application program.

* * * * *